(12) United States Patent
Lügger et al.

(10) Patent No.: US 7,033,149 B2
(45) Date of Patent: Apr. 25, 2006

(54) MEDIUM PUMP ADAPTED FOR EASE OF DISASSEMBLY AND ASSEMBLY

(75) Inventors: Johannes Lügger, Hamburg (DE); Carsten Ziegs, Hamburg (DE)

(73) Assignee: Dolmar GmbH, Hamburg (DE)

( * ) Notice: Subject to any disclaimer, the term of this patent is extended or adjusted under 35 U.S.C. 154(b) by 66 days.

(21) Appl. No.: 10/257,464

(22) PCT Filed: Apr. 9, 2001

(86) PCT No.: PCT/EP01/04045

§ 371 (c)(1),
(2), (4) Date: Feb. 7, 2003

(87) PCT Pub. No.: WO01/77572

PCT Pub. Date: Oct. 18, 2001

(65) Prior Publication Data

US 2003/0152471 A1   Aug. 14, 2003

(30) Foreign Application Priority Data

Apr. 11, 2000 (DE) .......................... 200 06 638 U

(51) Int. Cl.
*F04B 19/22* (2006.01)

(52) U.S. Cl. .................. 417/470; 417/218; 417/222.1; 92/60.5; 92/13.4; 74/55; 74/56; 74/568 R

(58) Field of Classification Search ................ 417/218, 417/227.1, 970 X; 92/60.5, 13.4; 74/55, 74/56, 568 R
See application file for complete search history.

(56) References Cited

U.S. PATENT DOCUMENTS

| 3,435,914 | A | * | 4/1969 | Kunio | ........................ 184/6.28 |
| 4,036,326 | A | * | 7/1977 | Mukai et al. | .............. 184/27.1 |
| 4,797,073 | A | * | 1/1989 | Kubota | ........................ 417/461 |
| 4,847,999 | A | * | 7/1989 | Nagashima | ................ 30/123.4 |

FOREIGN PATENT DOCUMENTS

FR   2 617 574   1/1989

\* cited by examiner

*Primary Examiner*—Timothy S. Thorpe
*Assistant Examiner*—Emmanuel Sayoc
(74) *Attorney, Agent, or Firm*—McCormick, Paulding & Huber LLP

(57) ABSTRACT

A medium pump for a motor includes a pump case with a pump cylinder and a pump piston positioned displacaebly in the pump cylinder in the direction of a pump axle. The pump piston rotates about the pump axle by running off an oblique control surface and realizes axial pump movements against the pressure of a first spring. A pump lift adjusting device is removably positioned in a guide placed transversely to the pump axle and fixedly connected with the pump case.

11 Claims, 2 Drawing Sheets

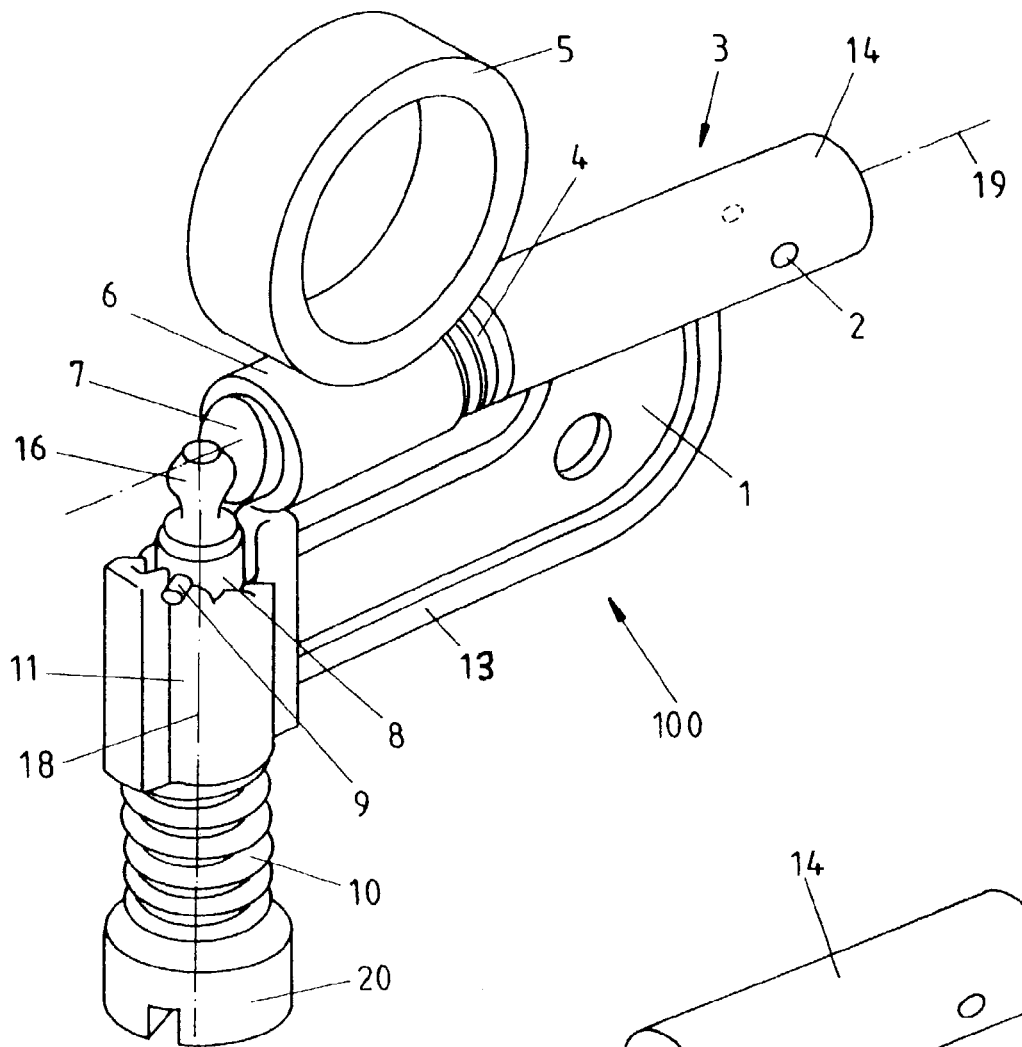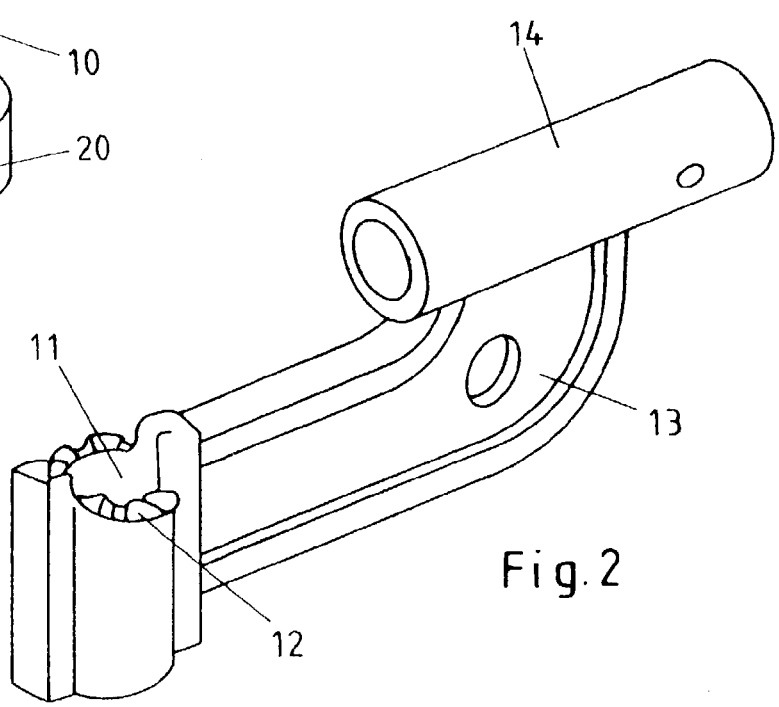

MEDIUM PUMP ADAPTED FOR EASE OF DISASSEMBLY AND ASSEMBLY

CROSS-REFERENCE TO RELATED APPLICATIONS

This application is entitled to the benefit of and incorporates by reference essential subject matter disclosed in International Application No. PCT/EP01/04045 filed on Apr. 9, 2001 and German Patent Application No. 200 06 638.2 filed on Apr. 11, 2000.

FIELD OF THE INVENTION

This invention relates to the field of pump technique. It concerns a medium pump according to the preamble of claim 1. Such a medium pump is known, for example, from the U.S. Pat. No. 4,797,073.

BACKGROUND OF THE INVENTION

Medium pumps for displacing liquid media have been known for a long time, in particular in form of lubricating oil pumps for motor chain saws or the like (see for example DE-A1-41 07 110 or the DE-A137 21 643 or the DE-A1-34 47 091 or the DE-C1-1 95 29 368). Such lubricating oil pumps in chain saws are complex structural components which are assembled by the manufacturer and which can be maintained by the user only by means of "special tools". Since the displaced oils tend to gum, it is necessary from time to time to disassemble the pump and to make it free from the gum accumulations. For the pumps known at present, this is only possible with the aid of special tools. Since the user of the chain saw does not have such special tools or since he does not have them continuously on him, this can mean a nonworking time.

SUMMARY OF THE INVENTION

Thus, the aim of this invention is to create a medium pump which can be simply disassembled, cleaned, put together again and which can be built-in again practically without any tool.

This aim is achieved by all the characteristics of claim 1. The core of the invention consists in the fixing of the pump piston in the pump cylinder only by the pump lift adjusting device and to configure the pump lift adjusting device itself removable from its guide without any tool. In this way, the pump as a whole can be easily dismantled, cleaned and put together again by simply removing the pump lift adjusting device.

A preferred embodiment of the medium pump according to the invention is characterized in that the pump lift adjusting device is positioned displaceable along a guiding axle in the guide associated to the pump case, that the guide is limited on its side turned to the pump piston axle by a setting surface placed transversely to the guiding axle and provided with snap-in deepenings, that the pump lift adjusting device is supported, when in the built-in condition, against the pressure of a spring by means of laterally projecting trunnions on the setting surface and that axially running grooves are provided in the guide, grooves in which the trunnions are guided when the pump lift adjusting device after twisting into a predetermined angular position is withdrawn from the guide. In this embodiment, for dismantling the pump, the pump lift adjusting device is first displaced axially against the spring pressure as far as the laterally projecting trunnions of the adjusting device are above the grooves placed laterally from the guide. The alignment of the trunnions and of the grooves is achieved with a subsequent torsion of the adjusting device. The pump lift adjusting device can then be withdrawn from the guide by releasing the spring, whereby the trunnions in the grooves can glide out in direction of the guiding axle. The assembly takes place in the reverse order.

Preferably, the pump lift is adjustable by a displacement of the pump lift adjusting device in direction of the guiding axle and the setting surface provided with snap-in surfaces for adjusting the pump lift adjusting device is graded in height. By correspondingly twisting the pump lift adjusting device about the guiding axle, the trunnions supported on the setting surface are brought to different height levels which correspond to an axial displacement of the pump hub adjusting device. The oil pump piston which is placed orthogonally to the adjusting device, pressed with its oblique control surface by resilience to the control head of the adjusting device, describes a lift movement by rotation. The axial displacement of the adjusting device causes a variation of the distance between the control head of the adjusting device and the center axle of the pump piston which causes the variation of the lift movement of the piston and likewise of the lift capacity.

The adjustment and dismounting or mounting of the medium pump ist particularly simple when, according to a preferred further development, the pump lift adjusting device projects at its end opposite the control head with an adjusting head out of the guide, by means of which it can be twisted about the guiding axle, the adjusting head is slit in the manner of a screw head and the second spring is supported with the one end on the guide and with the other end on the adjusting head.

BRIEF DESCRIPTION OF THE DRAWINGS

The invention will be explained in detail below by means of embodiments with reference to the attached drawings.

FIG. 1 shows a perspective view of a preferred embodiment of a medium pump according to the invention in assembled condition.

FIG. 2 shows the pump case of the medium pump according to FIG. 1.

DETAILED DESCRIPTION OF THE PREFERRED EMBODIMENTS

Figure 3:
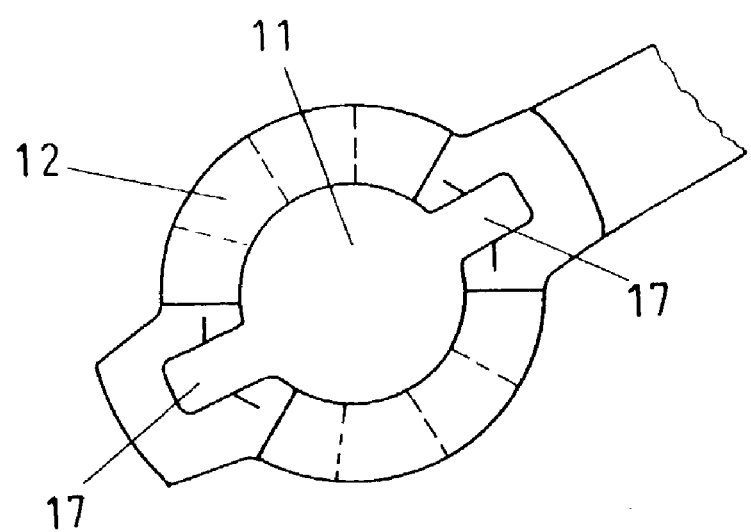
FIG. 3 shows a section of a topview on the guide of the adjusting device of the medium pump according to FIG. 1 with its setting surface.

In FIG. 1, a preferred embodiment of a medium pump according to the invention in assembled condition is represented in a perspective view. The medium pump 100, which is configured in the represented example as a lubricating oil pump for a motor chain saw, comprises a pump case 1 with a pump cylinder 14 and with a (hollow cylindrical) guide 11 which are connected with each other by a connecting piece 13 in such a way that their axles 18 and 19 cross at a right angle (see also FIG. 2). A pump piston 6 is positioned displaceable in the pump cylinder 14 in direction of the pump axle 19. The pump piston 6 projects with one end out from the pump cylinder 14 and is provided with an coaxially placed pinion which is in mesh with a driving worm 5

(represented only schematically) driven by the motor of the chain saw. The free end of the pump piston 6 is terminated on the front side by an oblique control surface 7 which is in contact with a fixed control head 16. The spring 4 presses the pump piston 6 with its oblique control surface against the control head 16 of the adjusting device 8, whereby the spring 4 is supported on one side on the pump cylinder 14 and at the other end on the pinion. The pump piston 6 is set rotating about the pump axle 19 during the motor operation over the driving worm 5 and the pinion. Due to this rotation, the control surface 7 runs off on the control head 16 and thus sets the pump piston 6 in periodical axial pump movements. The pumped medium then enters (during the suction stroke of the pump piston) the pump cylinder 14 by a suction opening 2 and is exhausted again by a pressure opening 3 (during the pressure stroke of the pump piston).

Figure 4:
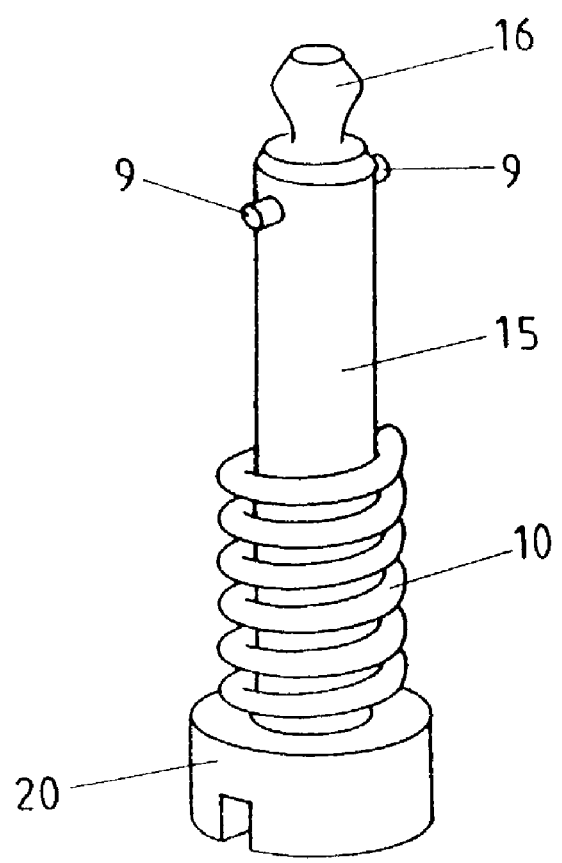
FIG. 4 shows the pump lift adjusting device of the medium pump according to FIG. 1 in disassembled condition.

The control head 16 is a part of a pump lift adjusting device 8 (represented separately in FIG. 4). The control head 16 is placed at the one end of a shaft 15 of the pump lift adjusting device 8. At the other end of the shaft 15 there is an adjusting head 20 which is provided with a slot in the manner of a screw head. A (spiral) spring 10 is pushed over the shaft 15, this spring being supported with its one end on the adjusting head 20. Two laterally projecting opposite trunnions 9, preferably formed by a dowel pin, are placed below the control head 16. When in built-in condition (FIG. 1), the pump lift adjusting device 8 is positioned displaceable in the guide 1 in direction of the axle 18, whereby the bore hole of the guiding 11 is adapted to the outer diameter of the shaft 15. The pump lift adjusting device 8 is then supported against the pressure of the spring 10 by means of the trunnions 9 on the setting surface 12 of the guide (FIG. 3). An automatic torsion of the pump lift adjusting device 8 is avoided by the fact that snap-in deepenings, in which the trunnions 9 snap in due to the pressure of the spring 10, are provided in the setting surface for determined angular positions. Different snap-in positions are at different height levels of the setting surface 12 so that a change of the snap-in position (by torsion of the pump lift adjusting device) causes a displacement of the pump lift adjusting device 8 in direction of the axle 18 and thus (due to the cooperation of control head and control surface 7) a variation of the pump lift.

The mounting and dismounting of the pump lift adjusting device 8 into or out of the guide 11 is made possible in a simple manner in that corresponding grooves 17 (FIG. 3) are provided in the guide, grooves in which the trunnions 9 of the pump lift adjusting device 8 can glide in axial direction when in an appropriate angular position. For the dismounting of the mounted medium pump 100 (FIG. 1), by actuating the adjusting head 20, the pump lift adjusting device 8 is first lifted against the pressure of the spring 10 in axial direction until the trunnions 9 on the setting surface 12 are unlocked. The pump lift adjusting device 8 is then twisted until the trunnions 9 are aligned with the grooves 17 and the pump lift adjusting device 8 can be withdrawn out of the guide 11 downwards. When the pump lift adjusting device 8 is withdrawn out of the guide 11, the pump piston 6 can be easily removed out of the pump cylinder 14 so that all the parts of the medium pump 100 are accessible and can be cleaned. After cleaning, the mounting takes place in the reverse order.

The characteristics and advantages of the solution according to the invention can be summarized as follows.

Due to the arrangement of the components (pump piston 6 and pump lift adjusting device 8) to each other, the pump case 1 can be configured in such a way that the fitting of the pump lift adjusting device 8 fixes the pump piston 6 in its position.

Due to the special configuration of the pump case 1 in the area of the guide 11 with its setting surface 12 as well as of the pump lift adjusting device 8, the pump lift adjusting device 8 can be completely pre-assembled according to FIG. 4 and, after having connected the pump case 1 and the pump piston 6, can be inserted through the pump case 1 by means of the grooves 17 and locked by a "tool-free" torsion in its setting range so as not to slip.

The medium pump 100 can then be installed in the chain saw as a completely pre-assembled unit. Should it come to problems with the pump during the operation of the chain saw, the user can dismantle the pump, disassemble it "tool-free" in single parts, put it together and install it again "tool-free".

LIST OF NUMERALS

1 Pump case
2 Suction opening
3 Pressure opening
4 Spring
5 Driving worm
6 Pump piston
7 Control surface
8 Pump lift adjusting device
9 Trunnion
10 Spring
11 Guide
12 Setting surface
13 Connecting piece
14 Pump cylinder
15 Shaft (pump lift adjusting device)
16 Control head (pump head adjusting device)
17 Groove
18 Guiding axle (pump head adjusting device)
19 Pump axle
20 Adjusting head (slit)
100 Medium pump

The invention claimed is:

1. A medium pump, in particular a lubricating oil pump for a motor chain saw, comprising a pump case with a pump cylinder and a pump piston positioned displaceable in the pump cylinder in direction of a pump axle, removable on one side, whereby the pump piston, by rotation about the pump axle by running off an oblique control surface placed on the pump piston on a control head of an adjustable pump lift adjusting device realizes axial pump movements against the pressure of a first spring, whereby the pump lift adjusting device is positioned removable in a guide placed transversely to the pump axle and fixedly connected with the pump case, whereby the pump piston in the pump cylinder is maintained against the pressure of the first spring by the pump lift adjusting device in such a way that, after having removed the pump lift adjusting device out of the guide, the pump piston can be freely removed from the pump case, characterized in that the pump lift adjusting device can be removed out of the guide without any tool, whereby axially running grooves are provided in the guide, grooves in which laterally projecting trunnions are guided when the pump lift adjusting device is drawn out of the guide after a torsion into a predetermined angular position.

2. A medium pump according to claim 1, characterized in that the pump lift adjusting device is positioned displaceable in the guide along a guiding axle, the guide being limited on its side adjacent the pump axle by a setting surface placed transversely to the guiding axle and provided with snap-in deepenings and that the pump lift adjusting device is supported on the setting surface, when in the built-in condition, against the pressure of a second spring by means of laterally projecting trunnions.

3. A medium pump according to claim 2, characterized in that the pump lift is adjustable by a displacement of the pump lift adjusting device in direction of the guiding axle and that the setting surface is graded in height for adjusting the pump lift adjusting device.

4. A medium pump according to claim 3, characterized in that the pump lift adjusting device projects at its end opposite the control head with an adjusting head out of the guide, control head by means of which it can be twisted about the guiding axle.

5. A medium pump according to claim 4, characterized in that the adjusting head is slit in the manner of a screw head.

6. A medium pump according to one of the claim 1, characterized in that the adjusting head is knurled on its periphery and/or on its covering surface so that a tool-free adjustment is possible.

7. A medium pump according to claim 2, characterized in that the adjusting head is knurled on its periphery and/or on its covering surface so that a tool-free adjustment is possible.

8. A medium pump according to claim 3, characterized in that the adjusting head is knurled on its periphery and/or on its covering surface so that a tool-free adjustment is possible.

9. A medium pump according to claim 4, characterized in that the adjusting head is knurled on its periphery and/or on its covering surface so that a tool-free adjustment is possible.

10. A medium pump according to claim 4, characterized in that the second spring is supported with its one end on the guide and with the other end on the adjusting head.

11. A medium pump, comprising:

a pump case with a pump cylinder and a pump piston positioned displaceable in said pump cylinder in direction of a pump axle, whereby said pump piston realizes axial pump movements against the pressure of a spring;

said pump lift adjusting device includes a laterally projecting trunnion which is biased by said spring in a first direction against setting surfaces formed on a guide, said guide accommodating said pump lift adjusting device for axial movement therein; and a groove extending completely through said guide, said trunnion traveling along said groove, in said first direction, past a plane of said setting surfaces and through said guide, when said pump lift adjusting device is removed from said guide.

* * * * *